April 7, 1959     J. A. CLARK     2,881,323
SERIOGRAPH

Filed Feb. 8, 1955     7 Sheets-Sheet 1

INVENTOR
JAMES A. CLARK

BY Fisher & Christen,
ATTORNEYS

April 7, 1959    J. A. CLARK    2,881,323
SERIOGRAPH

Filed Feb. 8, 1955    7 Sheets-Sheet 2

INVENTOR
JAMES A. CLARK
BY Fisher & Christen,
ATTORNEYS

April 7, 1959　　　J. A. CLARK　　　2,881,323
SERIOGRAPH
Filed Feb. 8, 1955　　　　　　　7 Sheets-Sheet 3

INVENTOR
JAMES A. CLARK
BY *Fisher & Christen,*
ATTORNEYS

April 7, 1959
J. A. CLARK
2,881,323
SERIOGRAPH
Filed Feb. 8, 1955
7 Sheets-Sheet 4
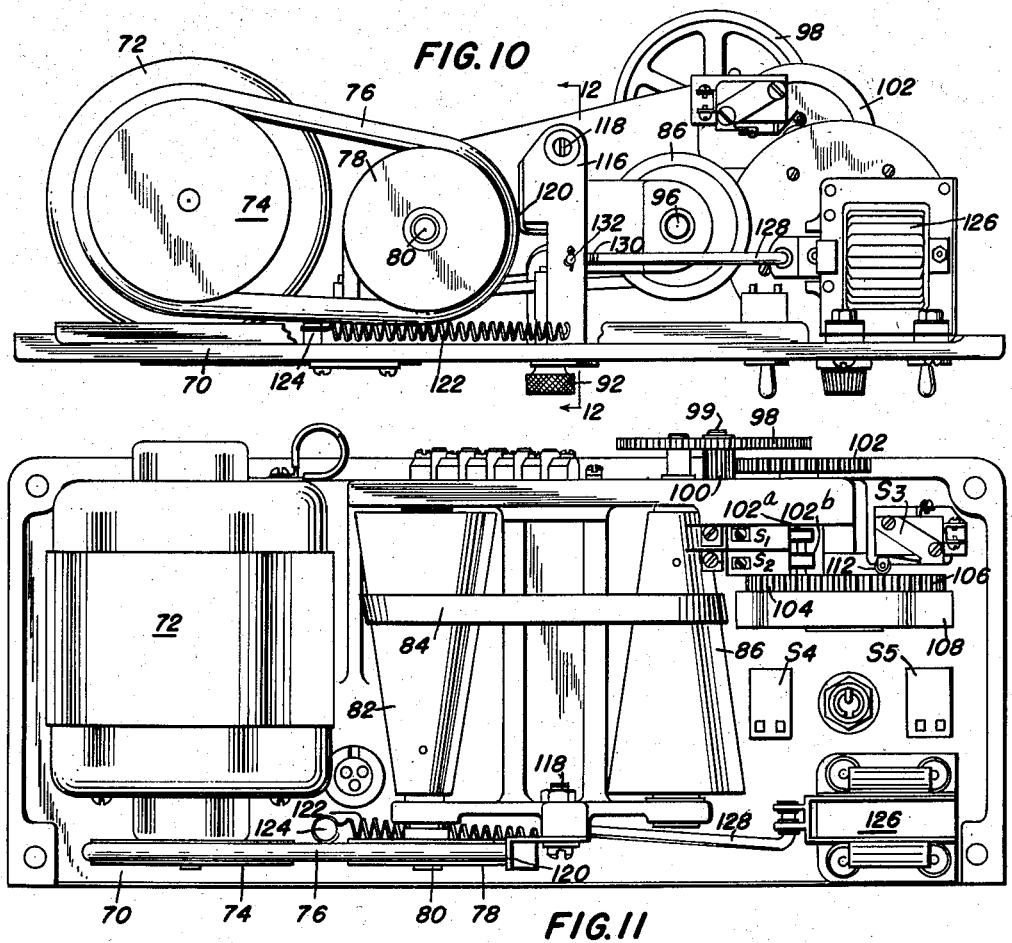
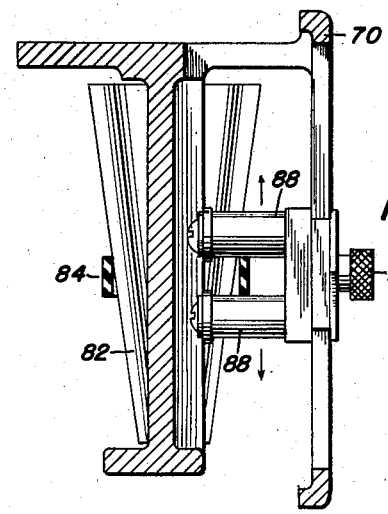
INVENTOR
JAMES A. CLARK
BY *Fisher & Christen,*
ATTORNEYS April 7, 1959 J. A. CLARK 2,881,323
SERIOGRAPH
Filed Feb. 8, 1955 7 Sheets-Sheet 5
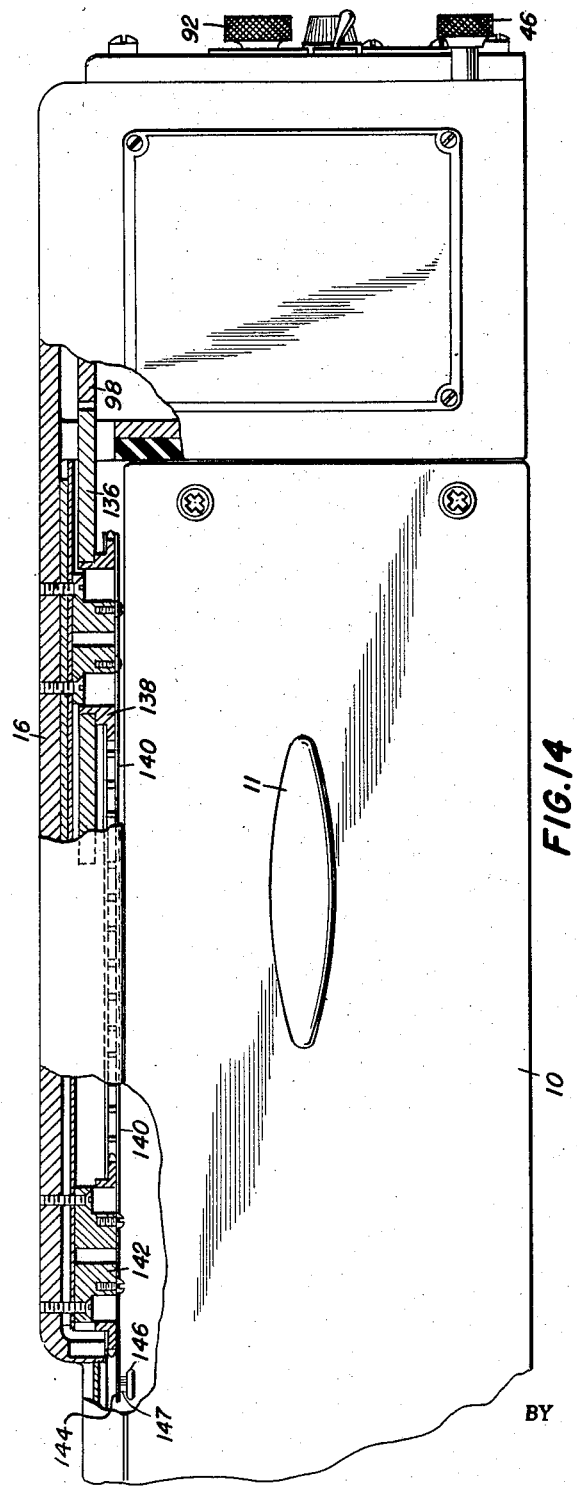
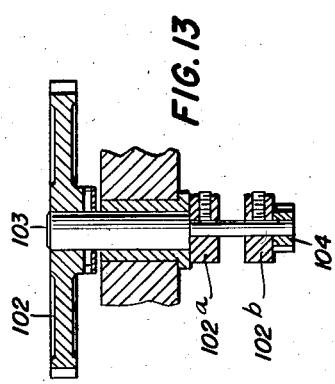
INVENTOR
JAMES A. CLARK
BY Fisher & Christen,
ATTORNEYS April 7, 1959 J. A. CLARK 2,881,323
SERIOGRAPH Filed Feb. 8, 1955 7 Sheets-Sheet 6

INVENTOR
JAMES A. CLARK

BY *Fisher & Christen,*
ATTORNEYS

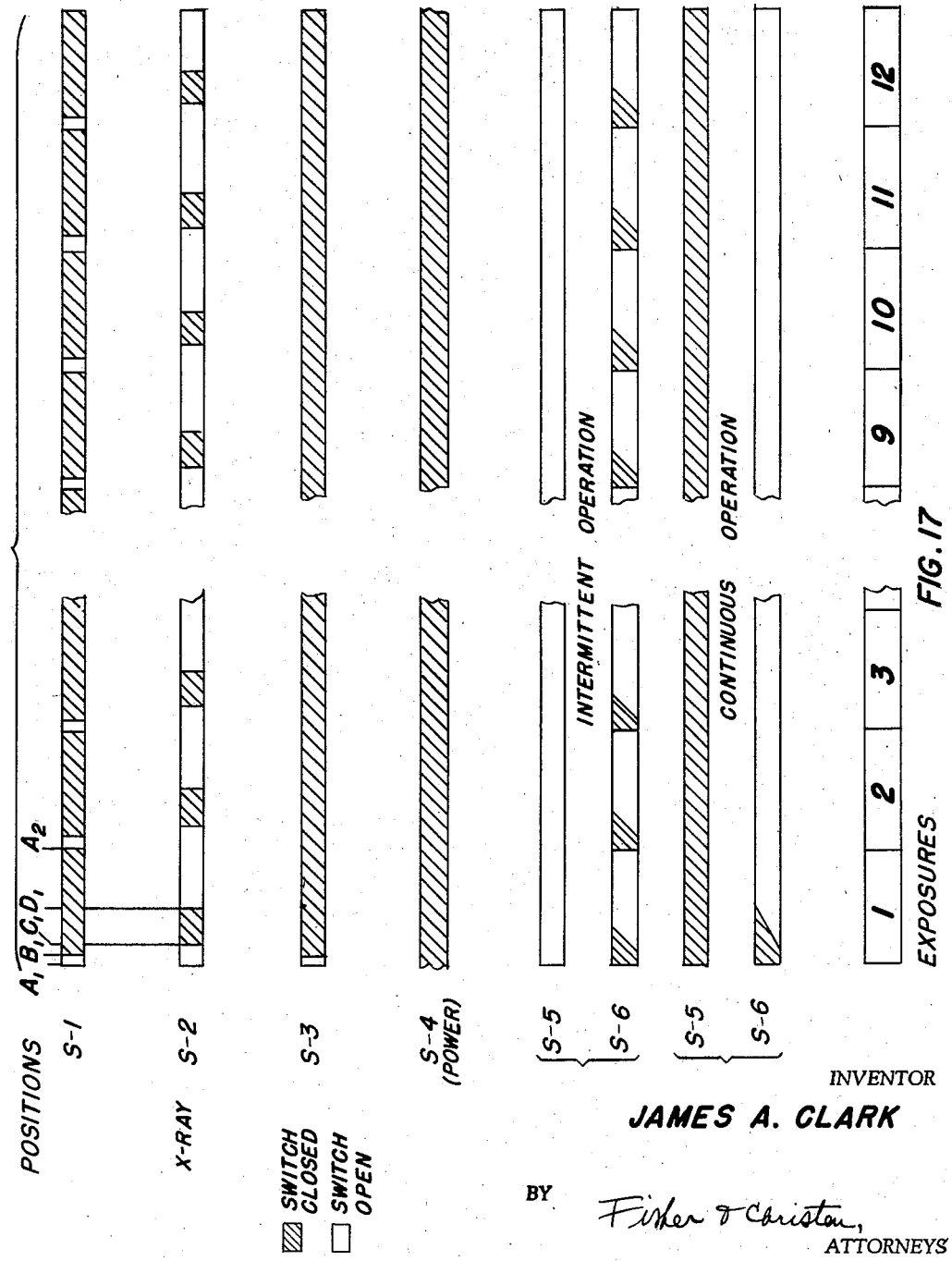

United States Patent Office 2,881,323
Patented Apr. 7, 1959

2,881,323

SERIOGRAPH

James A. Clark, West Hyattsville, Md., assignor to The Automatic Seriograph Corporation, College Park, Md.

Application February 8, 1955, Serial No. 486,847

6 Claims. (Cl. 250—66)

This invention relates to improvements in an automatic seriograph machine for diagnostic X-ray use and more particularly for taking roentgenograms of the brain, heart, lungs, kidneys and the like and for studying the circulatory processes thereof.

The present invention comprises improved control circuits and switches for taking X-rays in fairly rapid succession at intervals of from ½ to 2 or more seconds, as required, as where it is desired to study the progress and diffusion of a substance opaque to X-rays, through various parts of the body. In addition, the invention also comprises control switches for taking single X-ray pictures, at controllable intervals.

As will be disclosed in more detail hereinbelow, the seriograph of the invention employs a cassette holder which is mounted to move on a horizontal axis for use in either a horizontal or vertical position, the cassette holder being provided with improved features for bringing the cassettes successively to the exposure position and then transferring to a second compartment after exposure. More particularly, the cassette holder comprises a housing mounted on vertically adjustable forked standards for supporting the housing for movement about a horizontal axis, which axis is near the center of gravity of the housing; accordingly the housing is balanced to move readily about such axis.

The housing is provided with a slidable drawer having two compartments, one for holding the cassettes before exposure, the other for holding the cassettes after exposure, and with automatic mechanism for rapidly transferring the cassettes from one compartment to the other. The first or storage compartment is provided with a spring-operated bottom and special manually controlled latching means for use in loading the compartment and releasing the spring tension after loading for normal operation.

The second compartment for the exposed cassettes, on the other hand is provided with an inclined and shouldered wall, which wall in effect is the bottom of the compartment when the drawer is in a vertical plane and which is of particular value when the drawer is in a vertical plane in that the lower edges of the exposed cassettes, as they arrive successively in the storage compartment after exposure, slide down the inclined wall, hit the shoulder thereon, the top of the cassette continuing a little farther, so that the cassette comes to rest in an inclined position. The several exposed cassettes, therefore, stack themselves at the far side of the drawer, even though they are positioned in nearly a vertical plane.

The invention also involves improved structural features of the cassette itself.

The invention will be described in more detail by reference to the accompanying drawings, wherein:

Fig. 10 is a side view of the motor driven apparatus for transferring exposed cassettes;

Fig. 11 is a plan view of the apparatus of Fig. 10;

Fig. 12 is an enlarged section taken along section line 12—12 of Fig. 10;

Fig. 13 is a sectional view of a detail;

Fig. 14 is a vertical sectional view through a portion of the top of the cassette moving apparatus;

Fig. 17 is a chart illustrating the time relation for the opening and closing of the several circuits.

Figure 1:
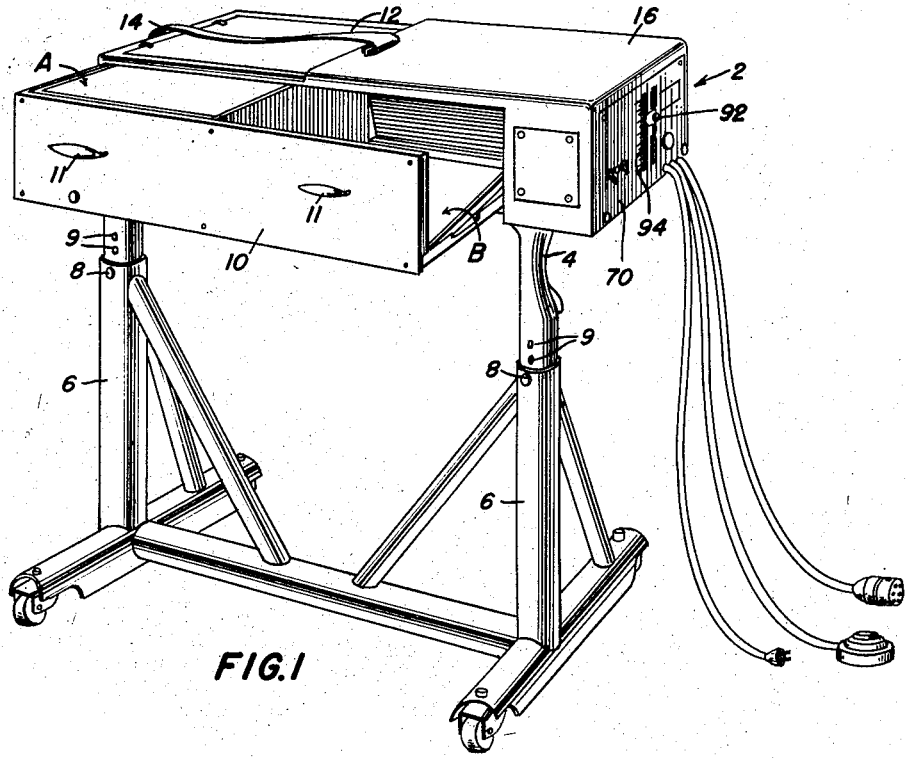
Fig. 1 is a perspective view of the cassette holder of this invention in the horizontal position.
Figure 2:
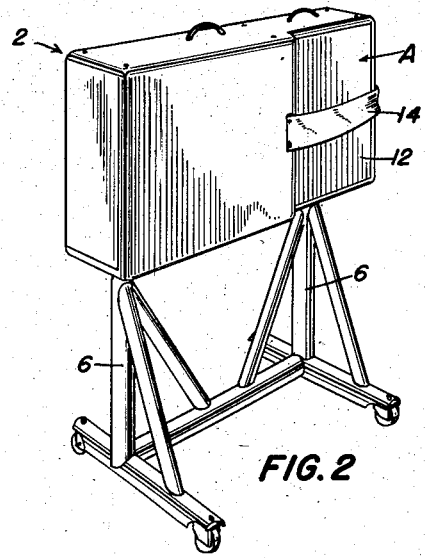
Fig. 2 is a perspective view showing the cassette holder in a vertical position.
Figure 3:
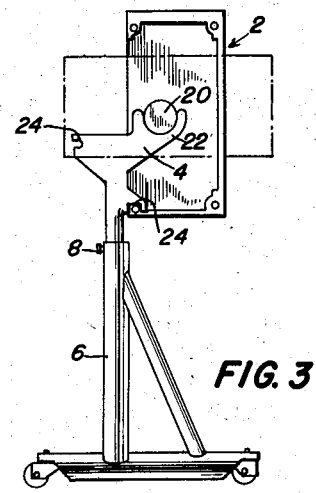
Fig. 3 is an end view of the cassette holder of Fig. 2.
Figure 4:
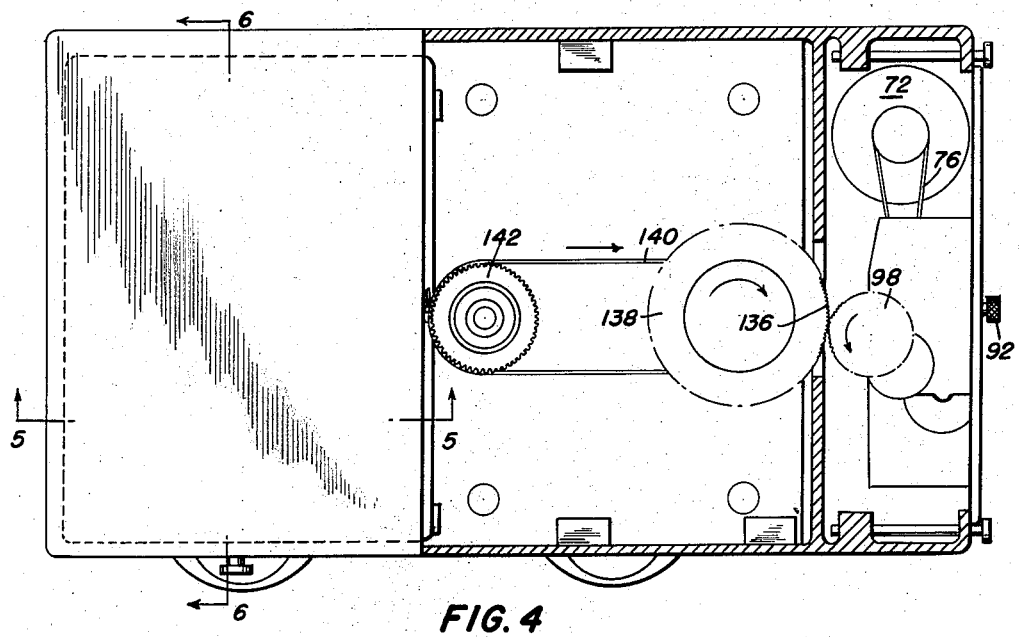
Fig. 4 is a horizontal cross-section of the cassette holder.

Referring now to these drawings, as shown in Figs. 1 through 3 the cassette holder comprises a housing indicated generally at 2, supported on forked brackets 4, which telescope into hollow standards 6 and are vertically positionable at desired heights by pins 8 positionable in holes 9 in brackets 4.

The box-like housing 2 is built to accommodate a slidable drawer 10 with handles 11, the drawer having a compartment A for holding a stack of unexposed cassettes, and a second, adjacent compartment B for receiving the cassettes after exposure. That portion of the housing 2 above compartment A is provided with a suitable cover 12 pervious to X-rays and may be provided with a strap 14 for holding the patient in position. The housing above compartment B has a cover 16.

The inside of the housing 2 near each end is provided with two aligned bosses or trunnions 20, defining an axis going nearly through the center of the housing. These trunnions 20 fit into the forks 22 of brackets 4 so that the casing may be readily swung about the axis defined by the trunnions 20 to either the horizontal or vertical position, as in Fig. 3. Bracket 4 is provided with notches 24 adapted to engage conventional latches carried by the casing 2 to latch the casing in either position.

Figure 5:
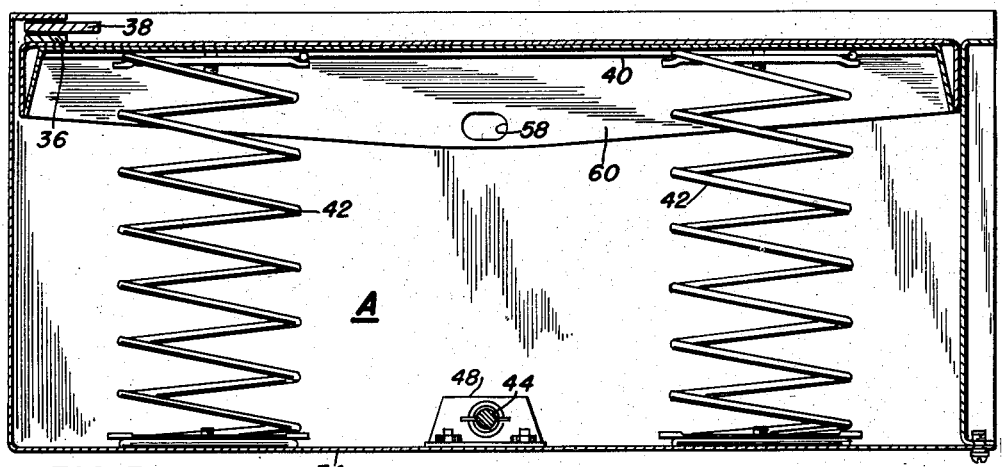
Fig. 5 is a vertical cross-section taken along section line 5—5 of Fig. 4.
Figure 6:
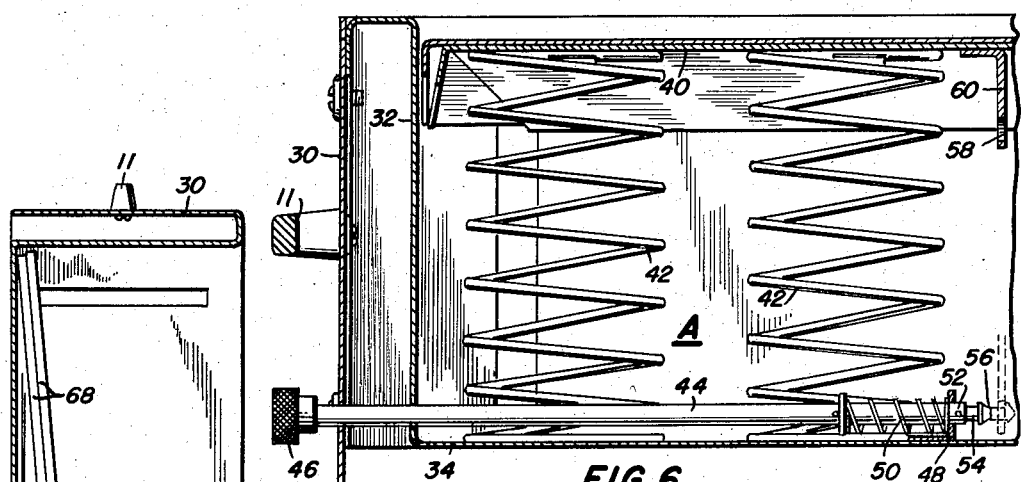
Fig. 6 is a vertical cross-section taken along section line 6—6 of Fig. 4.

Referring now to Figs. 5 and 6, compartment A of drawer 10 comprises a front wall 30, an inner wall 32 and a bottom wall 34. The upper peripheral edge of compartment A is provided on the front, left and rear with a grid frame 36 and a grid support 38, against the underside of which the peripheral edges of a cassette are pressed by the movable, spring-pressed presser plate 40. The presser plate 40 is pressed upwardly by a series of compression springs 42, preferably about eight such springs being used, confined between plate 40 and the bottom 34 of compartment A. These springs are fairly strong, their function being to press as many as about 12 cassettes upwardly to exposure position.

An important feature in this connection is a hand-operated spring latching means for holding down the presser plate for loading. This comprises a latch rod 44 having a hand operated knob 46, the rod 44 passing through an angle bracket 48; rod 44 is provided with a fixed washer, between which and the angle bracket 48 is confined a compression spring 50; a limit pin 52 is carried by rod 44 on the other side of the bracket 48. The end of rod 44 is provided with a latching groove 54 and head 56. The parts just described latch into a hole 58 in the vertical face of an angle bracket 60 secured to the underside of presser plate 40, this bracket being located at about the middle of the presser plate, as shown in Fig. 5.

In the process of loading compartment A with a stack of unexposed cassettes, the operator presses down on plate 40 with one hand, and when hole 58 is in line with end 56 of rod 44, pushes the rod end into the hole, releases pressure on plate 40, thereby latching it down. The desired number of cassettes, usually from six to twelve, are stacked on plate 40, after which pressure is applied to release rod 44 so that it can be withdrawn from hole 58, the stack of cassettes thereby being pressed strongly upwardly by the several springs 42, so that as successive cassettes are exposed and removed, an unexposed cassette is moved to exposure position.

An important feature of the invention is that the cassette holder is pivoted on a horizontal axis as defined by trunnions 20, as shown in Fig. 3, so that it may be readily moved back and forth between positions in horizontal and vertical planes. With such apparatus, two of the machines may be set side by side, and two X-ray pictures may be taken simultaneously, on different axes. When the cassette holder is in a horizontal plane, the exposed cassettes, when carried from compartment A to B, readily drop by gravity to the bottom of B. However, when the drawer 10 is in the vertical position, as in Fig. 7, gravity is not effective, and an improved feature is utilized for causing the cassettes to stack readily toward the bottom of B.

Figure 7:
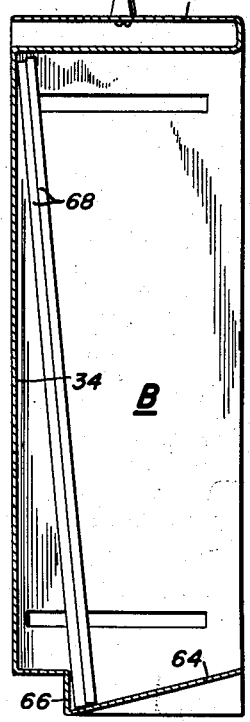
Fig. 7 is a cross-section of the cassette drawer for exposed cassettes, the drawer being in a vertical position.

As shown in Fig. 7, compartment B for the exposed cassettes comprises a bottom 34, which is a continuation of wall 34 of compartment A, and has a front wall 30. The important feature is an inclined back (or bottom) wall 64, which in Fig. 7 is in effect a bottom wall, downwardly inclined toward the bottom 34, as seen in Fig. 7. This wall 64 is provided with an upwardly and inwardly extending shoulder 66. As the exposed cassettes 68 are fed into compartment B, the bottom edges ride down slope 64 and engage against shoulder 66, while the top edges continue and fall toward wall 34, so that the cassettes are diagonally stacked against wall 34, as in Fig. 7, when the holder is in the vertical position.

Referring now to Figs. 10, 11 and 12, the mechanism for periodically moving the cassettes from exposure position in compartment A to compartment B will now be described, this mechanism being positioned in the right hand side of housing 2, Fig. 1. This mechanism comprises a base or mounting plate 70, on which is mounted a motor 72 which drives pulley 74 and round belt 76 thereon, belt 76 driving pulley 78 on shaft 80 carrying cone pulley 82 which drives belt 84, which in turn drives reverse cone pulley 86. Belt 84 may be moved lengthwise of the cones by rollers 88, Fig. 12, mounted on a bracket between the cone pulleys to straddle belt 84. This bracket may be moved lengthwise of the cones by knob 92 to provide thereby a change speed drive. Knob 92 carries screw threads so that it may be loosened, moved and tightened, as desired. The outside of plate 70, alongside knob 92 is provided with calibrations 94 for indicating the speed.

As shown in Fig. 11, cone 86 is mounted on shaft 96 on the end of which is a small pinion which meshes with and drives a large gear wheel 98 on shaft 99, which shaft drives small gear 100, which in turn meshes with and drives a cam-drive or timing gear 102 on shaft 103, and thereby drives two timing cams 102A and 102B secured by set screws on shaft 103, Fig. 13. In addition, shaft 103 also drives a small pinion 104 which meshes with and drives a large drum gear 106 which carries a numbered drum 108, usually numbered from 1 to 12 for indicating the number of exposures.

As further shown in Fig. 11, timing cam 102A operates a microswitch S1 to close a circuit for starting the X-ray mechanism. The other timing cam 102B operates a microswitch S2, after a cassette has been exposed and transferred, to open the X-ray circuit and to close the solenoid brake circuit, so that the brake spring actuates the brake (described below) to stop the motor instantly after each exposure. A third microswitch S3, operated by a roller 112 bearing against the side of a drum gear 106, is actuated once for each revolution of 106 by a cam thereon to open the X-ray circuit and to open the brake circuit after 12 cassettes have been exposed, to stop the machine.

The brake for stopping the motor quickly comprises a brake arm 116, Fig. 10, pivoted on a shaft 118 and provided with a brake shoe 120 adapted to press against motor driven belt 76 by means of a strong spring 122 attached to the lower end of arm 116 and having its other end anchored at 124 to the frame, the spring serving to apply the brake. The brake is held in the off position by a solenoid 126, operatively connected by rod 128 to brake shoe 120 at its threaded end 130 by a pin 132 swiveled in arm 116 to avoid binding. When the solenoid is energized, the brake is held in the off position; when de-energized, the spring 122 applies the brake shoe 120 to stop the belt 76 and the parts driven thereby. It will be noted that the described brake is self-energizing, in that when the spring 122 applies the brake, the friction causes the brake shoe to jam more tightly against the belt 76, stopping it very quickly.

The mechanism for removing an exposed cassette from exposure position and depositing it in compartment B, as previously described in connection with Fig. 1, will now be described. Such mechanism comprises sprockets and a chain positioned in a plane parallel to and below the top 16 of the housing. More specifically, the gear 98, Figs. 10 and 11, meshes with a driving gear 136, shown in Fig. 14, on the axis of which is a driving sprocket 138 which drives an endless chain 140 on driven sprocket 142.

Figure 8:
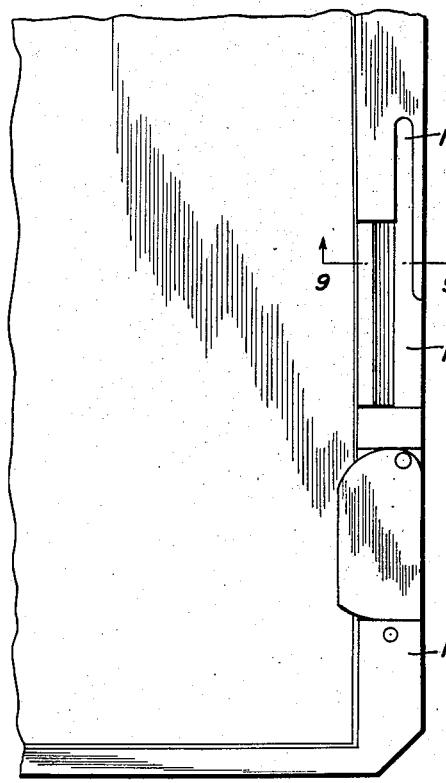
Fig. 8 is a plan view of a portion of a cassette showing a detail thereof.
Figure 9:
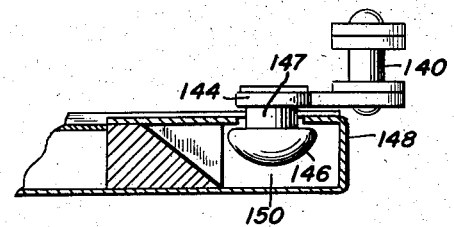
Fig. 9 is an enlarged section taken along section line 9—9 of Fig. 8.

Chain 140 carries an offset pin or button 144, Figs. 9 and 14, having an enlarged head or shoulder 146, this button being adapted to latch into one edge of an exposed cassette and transfer it to the compartment B for exposed cassettes. An important feature is the shape of this pin. The head is enlarged to provide a peripheral groove 147 which, in addition to engaging the edge of the cassette, supports the cassette during the transfer period, thus ensuring the cassette being drawn straight from compartment A without tilting or misalignment and ensures continuous, positive engagement of the pin with the cassette edge during entire transfer period. To this end, as shown in Fig. 8, one edge 148 of the cassette frame is provided with a top and laterally open groove or slot 150, this slot 150 being positioned in the path of pin 144 as it goes around sprocket 142. As the pin does this, the pin 144 snaps into slot 150 in the cassette and moves to the narrow end of the slot and button 146 engages and supports the cassette and carries it over compartment B. When the cassette is over B, pin 144 is rounding gear 138 and so releases itself from slot 150 in the cassette frame and the cassette drops into compartment B.

Figure 15:
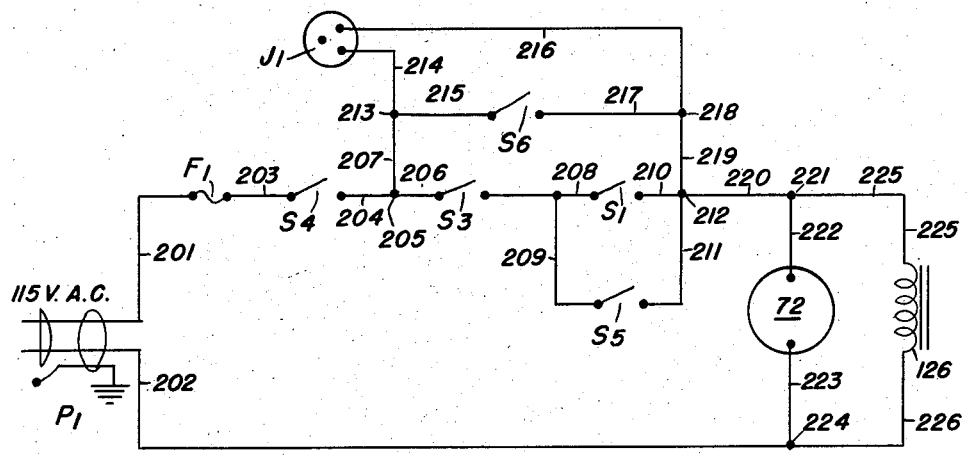
Fig. 15 is a schematic diagram of the circuits utilized in the seriograph of the invention.
Figure 16:
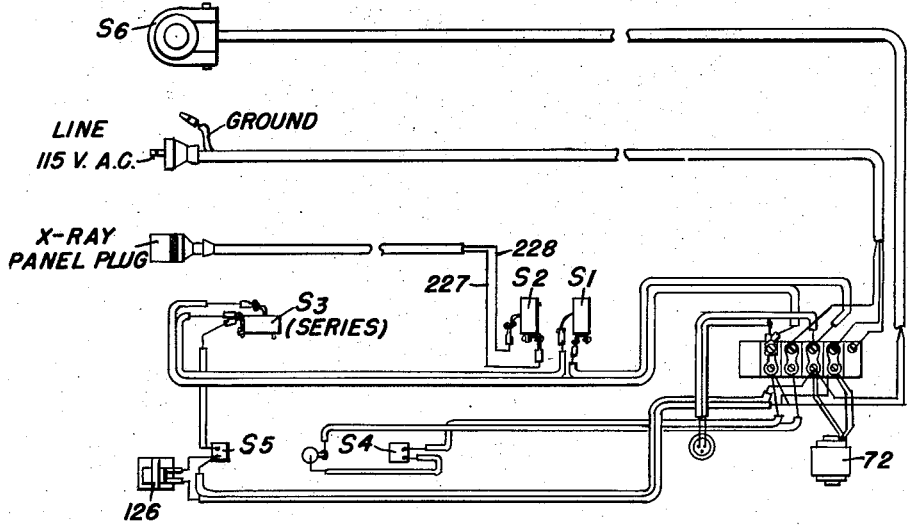
Fig. 16 is a detailed wiring diagram of the schematic shown in Fig. 15.

*Wiring diagrams, Figs. 15, 16 and 17*

Referring to Fig. 15, there is shown a pair of conductors 201 and 202 connected to a source of alternating current by means of a plug P–1. Conductor 201 connects to a fuse F–1 and through conductor 203 to power switch S–4 which is interposed between conductor 204 and conductor 203 for the purpose of energizing the motor 72 and the brake solenoid 126. Connector 204, then connects through a junction 205 and a conductor 206 to a switch S–3 the other end of which connects to switches S–1 and S–5. The conductors 210 and 211 connect the others ends of switches S-1 and S-5 to junction 212.

Conductor 214 also connects one pin of receptacle J-1 to conductor 207 through junction 213. Conductor 215 connects one side of switch S-6 to junction 213. The other pin of receptacle J-1 is connected to junction 212 through conductor 216, junction 218 and conductor 219. The other side of switch S-6 is connected to junction 218 through conductor 217.

Junction 221 is connected to junction 212 by conductor 220. Motor 72 is connected to junction 221 by conductor 222. The circuit to motor 72 is completed by conductor 223 to junction 224 which connects to conductor 202 and thus to the source of alternating current. Also connected to junction 221 is the brake solenoid 126 by conductor 225. The circuit to the brake solenoid 126 is completed by conductor 226 to junction 224.

A separate circuit composed of conductors 227, Fig. 16, switch S-2 and conductor 228 connected in series is connected to plug P-2. This circuit is not connected electrically to the circuit just described, but it is connected mechanically, in a manner to be described.

The motor 72, in addition to moving the exposed film out of position, also provides the various timing impulses by means of three cams and switch S-1, S-2, and S-3, as previously described.

The brake actuating solenoid 126 is so connected that whenever the motor 72 is energized there is no braking action. Conversely, whenever the motor 72 is not energized the full braking action is immediately applied. This rapid braking action is required if the high film changing speed is to be achieved.

The switches S-1 through S-6 perform the following functions. Switch S-1 is a micro-switch which is operated by a cam 102A, Fig. 13, driven by timing gear 102, Figs. 11 and 13, in turn driven by the motor. The purpose of switch S-1 is to stop the motor after each exposure. However, switch S-5 may "over-ride" switch S-1 and may close the motor circuit.

Switch S-2 is a micro-switch which is operated by cam 102B, driven by timing gear 102. The purpose of switch S-2 is to turn on the X-ray tube at the proper time in the cycle, i.e., when the unexposed film is in its proper place for exposure. Switch S-2 operates once each cycle.

Switch S-3 is also a micro-switch and is operated by a cam on the side of gear 106, Fig. 11. The purpose of switch S-3 is to turn off the motor at the end of the last cycle. This prevents idle operation of the apparatus and unnecessary activation of the X-ray tube.

Switch S-4 is a manually operated toggle switch used to turn the power on or off.

Switch S-5 is a manually operated toggle switch. This switch has two positions: Intermittent and Continuous. In the Intermittent position, switch S-1 controls the operation of the motor 72 and the brake solenoid 126 and as the name suggests the action is intermittent—the motor and brake are de-energized at the end of each exposure. The action can be re-started by momentarily closing switch S-6. In the Continuous position switch S-5 closes the circuit and so "over-rides" switch S-4 and the action is continuous until the end of the last exposure at which time switch S-3 opens.

Switch S-6 is a manually operated foot-switch. As shown in Fig. 15, switch S-6 is so connected that it will "override" switches S-1, S-3 and S-5. Thus it can energize the motor and the brake solenoid at any point in the cycle. For example, if switch S-5 is in the Intermittent position and if switch S-6 is closed, the device will operate until switch S-6 is opened and until switch S-1 or switches S-1 and S-3 open.

The sequence of operation of switches S-1 through S-6 is best understood by reference to Fig. 17. In this illustration the black areas represent the closure of a switch. The relative time durations are approximately indicated by the length of the spaces in the diagram.

At the beginning of a cycle, designated time $A_1$ in Fig. 17, switches S-1, S-2 and S-3 are open. If the operation is to be intermittent, switch S-5 is also open. Switch S-4 (the power switch) is assumed to be closed. Then if switch S-6 is closed, the brake solenoid will release and the motor will be energized. This will start the three cams revolving, and at time $B_1$ switches S-1 and S-3 will close. If only one exposure is desired, and if switch S-5 is in the Intermittent position, switch S-6 must be opened as soon as switches S-1 and S-3 close.

At time $C_1$ switch S-2 closes and thus initiates the X-ray exposure. At time $D_1$ switch S-2 opens.

Up to this point in the cycle the first X-ray plate has assumed to be stationary. By the time $D_1$, the exposure has been completed and the first plate can be moved out of the exposure area and the second plate moved into the exposure area. This action is completed by time $A_2$; also at time $A_2$ switch S-1 opens and if switches S-5 and S-6 are open the motor 72 will stop. If a second exposure is desired switch S-6 must be closed and the action just described is repeated.

If several exposures, in rapid succession, are desired, switch S-6 is held closed for the required number of exposures. If the full number of exposures (in this example 12) is desired switch S-6 can be held closed for 12 exposures but it is easier if switch S-5 is closed. With switch S-5 in the Continuous position, switch S-6 need be closed only momentarily at the beginning of the first exposure (held closed until time $B_1$). At the end of the 12th exposure switch S-3 will open and the motor M-1 will stop.

Receptacle J-1 is provided for remote operation of the machine and/or for the simultaneous operation of two or more machines. For remote operation all that must be done is to connect a switch across the two pins of receptacle J-1. For simultaneous operation of two or more machines the receptacles J-1 of each machine are connected in parallel by means of a two conductor cable. Then, whenever the switch S-6 is thrown, both machines will operate in synchronism.

It is to be understood, of course, that the foregoing description is merely illustrative of the invention, and that the spirit and scope of the invention is to be limited only by the breadth and scope of the appended claims.

I claim as my invention:

1. A seriograph for taking X-ray pictures in succession, comprising in combination a motor, an endless chain driven by said motor for successively transferring exposed cassettes from an exposure position to a storage compartment, a first control circuit for the motor for stopping the motor after a single exposure for intermittent operation, a second control circuit for the motor including a timing cam operated by the motor for causing the motor and chain to transfer a given number of exposed cassettes in timed sequence from exposure position to storage for continuous operation, said second circuit being in parallel with the first circuit and operative to cause the seriograph to operate intermittently or continuously.

2. A seriograph for taking X-ray pictures in succession, comprising in combination a motor, an endless chain driven by said motor for successively transferring exposed cassettes from an exposure position to a storage compartment, a change speed drive including a pair of reversed cones and a cooperating belt variably positionable on the cones for operatively connecting the motor and said chain, a first control circuit for the motor for stopping the motor after a single exposure for intermittent operation, a second control circuit for the motor including a timing cam operated by the motor for causing the motor and chain to transfer a given number of exposed cassettes in timed sequence from exposure position to storage for continuous operation, said second circuit being in parallel with the first circuit and operative to cause the seriograph to operate intermittently or continuously.

3. A seriograph for taking X-ray pictures in succession, comprising in combination a motor, an endless chain driven by said motor for successively transferring exposed cassettes from an exposure position to a storage compartment, a first control circuit for the motor for stopping the motor after a single exposure for intermittent operation, driving means operatively connecting the motor and chain, a spring-applied, solenoid-released brake in said first circuit, and operative on said driving means, to cause the spring to apply the brake to said driving means for stopping it when said first control circuit is broken to stop the motor, a second control circuit for the motor including a timing cam operated by the motor for causing the motor and chain to transfer a given number of exposed cassettes in timed sequence from exposure position to storage for continuous operation, said second circuit being in parallel with the first circuit and operative to cause the seriograph to operate intermittently or continuously.

4. A seriograph for taking X-ray pictures in succession, comprising in combination a motor, an endless chain driven by said motor for successively transferring exposed cassettes from an exposure position to a storage compartment, a first control circuit for the motor for stopping the motor after a single exposure for intermittent operation, a second control circuit for the motor including a timing cam operated by the motor for causing the motor and chain to transfer a given number of exposed cassettes in timed sequence from exposure position to storage for continuous operation, said second circuit being in parallel with the first circuit and operative to cause the seriograph to operate intermittently or continuously, a drum gear, driven by the motor and switch means controlled by said drum gear for stopping the motor after a given number of cassettes have been exposed and transferred to said storage compartment.

5. A seriograph for taking X-ray pictures in succession, comprising in combination a motor, an endless chain driven by said motor for successively transferring exposed cassettes from an exposure position to a storage compartment, a change speed drive including a pair of reversed cones and a cooperating belt variably positionable on the cones for operatively connecting the motor and said chain, a first control circuit for the motor for stopping the motor after a single exposure for intermittent operation, a second control circuit for the motor including a timing cam operated by the motor for causing the motor and chain to transfer a given number of exposed cassettes in timed sequence from exposure position to storage for continuous operation, said second circuit being in parallel with the first circuit and operative to cause the seriograph to operate intermittently or continuously, a drum gear, driven by the motor, and switch means controlled by said drum gear for stopping the motor after a given number of cassettes have been exposed and transferred to said storage compartment.

6. A seriograph for taking X-ray pictures in succession, comprising in combination a motor, an endless chain driven by said motor for successively transferring exposed cassettes from an exposure position to a storage compartment, a first control circuit for the motor for stopping the motor after a single exposure for intermittent operation, driving means operatively connecting the motor and chain, a spring-applied, solenoid-released brake in said first circuit, and operative on said driving means, to cause the spring to apply the brake to said driving means for stopping it when said first control circuit is broken to stop the motor, a second control circuit for the motor including a timing cam operated by the motor for causing the motor and chain to transfer a given number of exposed cassettes in timed sequence from exposure position to storage for continuous operation, said second circuit being in parallel with the first circuit and operative to cause the seriograph to operate intermittently or continuously, a drum gear, driven by the motor, and switch means controlled by said drum gear for stopping the motor after a given number of cassettes have been exposed and transferred to said storage compartment.

References Cited in the file of this patent
UNITED STATES PATENTS

| | | |
|---|---|---|
| 516,452 | Schwerdt | Mar. 13, 1894 |
| 798,261 | Brown | Aug. 29, 1905 |
| 1,170,043 | Brown | Feb. 1, 1916 |
| 1,172,943 | Cook | Feb. 22, 1916 |
| 2,107,825 | Humphreys | Feb. 8, 1938 |
| 2,617,944 | Sanchez-Perez | Nov. 11, 1952 |